166-308.
XR  3,575,240

United States Patent

[11] 3,575,240

| [72] | Inventor | Vaughan W. Rhoades<br>Tulsa, Okla. |
|---|---|---|
| [21] | Appl. No. | 819,434 |
| [22] | Filed | Apr. 25, 1969 |
| [45] | Patented | Apr. 20, 1971 |
| [73] | Assignee | Cities Service Oil Comapny<br>Tulsa, Okla. |

[54] RECOVERY OF HEAVY OILS BY FRACTURING AND INJECTION OF GAS
14 Claims, No Drawings

[52] U.S. Cl..................................................... 166/263,
166/308
[51] Int. Cl..................................................... E21b 43/18,
E21b 43/26
[50] Field of Search.......................................... 166/263,
267, 268, 299, 305—308

[56] References Cited
UNITED STATES PATENTS

| RE23,733 | 11/1953 | Farris | (166/308UX) |
| 2,892,405 | 6/1959 | Chesnut | 166/299 |
| 2,909,224 | 10/1959 | Allen | 166/305 |
| 3,120,262 | 2/1964 | Archer | 166/263 |
| 3,252,512 | 5/1966 | Baker et al. | 166/305X |
| 3,263,751 | 8/1966 | Kiel et al. | 166/305X |
| 3,266,569 | 8/1966 | Sterrett | 166/263 |
| 3,368,627 | 2/1968 | Hurst et al. | 166/308X |
| 3,411,583 | 11/1968 | Holm et al. | 166/305 |
| 3,442,332 | 5/1969 | Keith | 166/267X |

*Primary Examiner*—Ian A. Calvert
*Attorney*—J. Richard Geaman

ABSTRACT: High-viscosity oil is recovered from subterranean reservoirs by a cyclic process that alternately enhances the mobility of the heavy oil at increasing distances from the production well and recovers the more mobile oil that drains into the vicinity of the production well. The increased mobility of the oil is achieved by the cyclic injection of a gas having a relatively high oil solubility into the reservoir through, and alternately producing the swollen oil from, the production well. The area of the formation contacted by the injection gas is greatly increased by fracturing the oil-bearing formation prior to gas injection. The fracture permits the injected gas to be carried into those areas of the formation not otherwise in immediate communication with the well and enhances the withdrawal of oil by providing a convenient path for the swollen oil to flow through in the formation to the production well.

RECOVERY OF HEAVY OILS BY FRACTURING AND INJECTION OF GAS

BACKGROUND OF THE INVENTION

1. Field of the Invention

This invention relates to the recovery of heavy oil from subterranean reservoirs. More particularly, it relates to a cyclic process in which the mobility of the heavy oil is enhanced at increasing distances from the production well.

2. Description of the Prior Art

A variety of techniques has heretofore been proposed for the recovery of heavy or high-viscosity oils, tars, and similar carbonaceous substances from underground reservoirs. These techniques, which have not generally been entirely satisfactory, include variations of conventional secondary recovery operations, such as water, gas, and underground combustion drives. In such techniques, a driving fluid is injected into the underground heavy oil-bearing formation through an injection well spaced apart from the production well. The difficulty with such techniques has involved the inability to establish an adequate pressure differential between the injection and production wells, while simultaneously effecting a sufficient reduction in the viscosity of the heavy oil in the vicinity of the production well so as to facilitate the movement of such oil into the production wellbore. In the absence of adequate combination of driving force and reduced viscosity, the mobility of the high viscosity oil has not been sufficiently enhanced to permit the recovery of the oil at desirable production rates.

The difficulties thus encountered in the prior art techniques had been compounded by the heterogeneous character of most underground oil-bearing formations. Because of the existence of rather wide variations in the permeability of various portions of such formations, the injected driving fluid tends to follow selective paths through the relatively more permeable channels of the formation from the injection well to the production well. Because of this channeling tendency, the driving fluid fails to contact the portions of the heavy oil that reside in the relatively less permeable portions of the formation. The sweep efficiency of the operation, as a result, is relatively poor. Because of this poor sweep efficiency, a large portion of the recoverable oil in the reservoir is bypassed, seriously limiting the overall effectiveness and efficiency of the oil recovery operation.

It is an object of the present invention, therefore, to provide an improved process for the recovery of high-viscosity oils from subterranean reservoirs.

It is another object of this invention to provide a process for the recovery of heavy oils at efficient production rates from subterranean reservoirs.

It is another object of the present invention to provide a heavy oil recovery method in which the mobility of the oil is enhanced.

It is another object of this invention to provide a method for the recovery of high-viscosity oils from subterranean reservoirs in which the effects of channeling are minimized.

It is a further object of the present invention to provide a method for the recovery of high-viscosity oils from subterranean reservoirs in which the sweep efficiency of the recovery operation is enhanced.

With these and other objects in mind, the invention is hereinafter set forth in detail, the novel features thereof being particularly pointed out in the appended claims.

SUMMARY OF THE INVENTION

The objects of the present invention are accomplished by a process in which the mobility of the heavy oil in a subterranean reservoir is enhanced by the dissolving of a highly soluble gas therein. The gas is injected into the reservoir through a well positioned therein at an injection pressure of at least the vapor pressure of the gas at the reservoir temperature. The injection pressure will generally be maintained, however, at a pressure not exceeding the point at which the injected gas converts to a separate liquid phase in the reservoir. The injection of gas is continued until oil in the vicinity of the well becomes saturated with the gas at the given injection pressure.

The gas injected into the formation will be a highly soluble one so that, upon saturation, the contacted oil will have experienced an appreciable swelling in volume. Because of this swelling, a considerable driving energy will have been imparted to the thus-contacted oil. Likewise, the appreciable swelling of the oil will also result in a significant reduction in the viscosity of the initially heavy oil. As a result, the thus-contacted oil will have a greatly enhanced mobility, which will enable it to flow in a manner that was not possible when the oil was in its original high-viscosity state.

The injection of gas is then interrupted, and the thus-saturated oil is withdrawn from the reservoir through the same well used to inject the soluble gas. The withdrawal of oil is continued until the instantaneous solution gas/oil ratio of the fluids produced from the well increases at a rapid rate. This increase in the gas/oil ratio will be due to the depletion of the saturated oil in the vicinity of the well. The gas injection operation is then continued so as to contact and improve the mobility of additional quantities of oil at increasing distances from the well.

This cyclic operation comprising injecting and withdrawal steps is thereafter continued so as to alternately swell additional quantities of high-viscosity oil at increasing distances from the well and to recover the thus-saturated oil from the reservoir. The cyclic operation can be continued until the cumulative solution gas/oil ratio of the fluids produced increases rapidly due to the decreased efficiency of the gas-oil contact as the zone of depletion in the vicinity of the well increases. This decreased efficiency is accompanied by a decreased ability of the thus-saturated oil to drain through the reservoir to the immediate vicinity of the well.

The area of contact between the injected gas and the oil during the injection operations may be enhanced by fracturing the oil-bearing formation so as to provide a gas transportation medium through the formation. This fracturing may be accomplished by conventional means. Because of the fracture, the injected gas will not be confined to the portion of the formation in the vicinity of the well, but will be carried into more distant regions of the formation so as to greatly increase the gas-oil interface during the injection operation. This increased gas-oil interface not only results in a great increase in the rate at which gas dissolves in the heavy oil, but also provides accessibility of the injected gas to a greater portion of the formation. The fracture also tends to facilitate each subsequent withdrawal step since the fracture provides a convenient path through which the swollen oil of increased mobility may flow, or drain, to the well.

In order to more efficiently utilize the available gas, the solution gas recovered from the well during the withdrawal steps may be separated from the recovered oil and injected into the reservoir through an offset well so as to saturate oil in the vicinity thereof while the withdrawal operation is continued at the original well. When the cycle is reversed and injection again commences at the original well, the saturated oil the vicinity of the offset well may then be withdrawn from the reservoir through that well, with its associated solution gas being recovered and injected back into the formation through the original well so as to saturate additional quantities of oil. By operating in this manner, the available solution gas may be continuously utilized for the saturation of heavy oil rather than being used solely in the inherently cyclic operation performed at a single well.

DETAILED DESCRIPTION OF THE INVENTION

The present invention may be used to enhance the recovery of high-viscosity oil from subterranean reservoirs through a single well positioned therein. Such viscous, or heavy, crude oils are commonly found in reservoirs at less than 1,000 foot depths in the oil-bearing formation at temperatures of generally from about 75° F. to about 100° F. Primary production of the heavy oil in such reservoirs, at economic rates, is made difficult or impossible by the very low reservoir pressures that characterize such heavy oil deposits, as well as the high viscosity of the oil itself. Because of this combination of low driving pressure and high viscosity, the heavy oil to which this invention is directed does not tend to flow readily into a well positioned in heavy oil-bearing subterranean reservoirs.

The present invention involves a cyclic operation that alternately enhances the mobility of a portion of the high-viscosity oil in the reservoir and withdraws the oil of increased mobility from the reservoir through a well positioned therein. The desired increase in the mobility of the heavy oil is achieved by injecting a highly soluble gas into the oil-bearing formation through the well to be used to recover the oil. While it is within the scope of the present invention to employ any oil soluble gas, it will be appreciated that the effectiveness of the process herein described is considerably enhanced when the injected gas is highly soluble in the crude oil being treated. By employing such a gas, the amount of gas that may be dissolved in the oil will naturally be greater than when a relatively less soluble gas is employed.

The dissolving of the injected gas into the reservoir crude oil causes the oil to swell in volume. When a highly soluble gas is injected into the formation, therefore, this swelling effect will be enhanced. Among the commonly available gases that are soluble in heavy crude oils, it has been found that ethane and carbon dioxide are sufficiently soluble so as to cause appreciable swelling of the heavy oil. These gases and mixtures thereof are, as a result, included within the scope of the term "gas highly soluble in said (heavy) oil," as used herein, as are any other readily available gases that are soluble in heavy oil to a sufficient extent to provide a degree of swelling at least on a general order of magnitude approximating that of ethane and carbon dioxide. It will be appreciated, however, that the numerical value of the solubility of any particular gas will vary to some extent depending on such factors as the nature of the particular heavy oil involved, its viscosity, the reservoir temperature and pressure, and the like. The numerical solubility of the injected gas forms no essential part of the invention, therefore, since the desired mobility of the contacted oil will depend upon these various factors and others, such as the permeability characteristics of the oil-bearing formation. Without attempting to place any critical limitation upon the scope of the present invention, it may nevertheless be observed that, as a general rule, the injected gas should be capable of swelling the oil by at least about 50 percent by volume in order to sufficiently enhance the mobility of the oil for effective recovery thereof.

In swelling the volume of the high-viscosity oil in the formation, the injected gas serves a twofold purpose. Thus, it imparts a driving energy to the thus-contacted oil, creating in effect a solution gas driving force therein, while also reducing the viscosity of the thus-contacted oil. The oil thereby tends to flow more readily and has an increased driving force associated therewith, the combination of these effects constituting the enhanced mobility of the thus-contacted oil.

The dissolving rate of the injected gas is dependent on the surface area of the fresh gas-oil interface. This area initially is equivalent to the area of the wellbore. It then increases as the solubility front grows outward. As the injected gas tends to move away from the wellbore, however, its dissolving capability becomes increasingly difficult because the injected gas tends to become separated from the fresh heavy crude oil in the formation by a band of previously saturated oil. The dissolving of additional quantities of gas can, in this instance, occur only to the extent that the injected gas can travel through the saturated oil bank and contact fresh, i.e. undersaturated, high-viscosity oil. At this point in the injection step, a rise in the required injection pressure will be noted.

At this point, a bank of saturated oil having an optimum enhancement of its mobility will be present in the formation. The gas injection step will be interrupted at this point or soon thereafter, as further injection of gas at increasing injection pressures will provide an increasingly limited contribution to the overall recovery operation. After the dissolving of the gas in the high-viscosity oil has been completed to this extent, the well will be opened for the flow of the thus-saturated oil thereto.

During the gas injecting step, a gas injection pressure of at least the vapor pressure of the gas at the given reservoir temperature will be maintained. Thus, the gas contacting the heavy oil in the formation will be caused to dissolve therein, rather than forming a separate gas phase in the formation. The existence of such a separate injection gas phase would result in a greatly increased gas/oil ratio during the production step, diminishing the overall effectiveness of the operation. The injection pressure may be any suitable pressure above the above-indicated vapor pressure that is within the capability of the aboveground gas pumping facilities but will generally be maintained at less than the pressure at which the injected gas converts to a separate liquid phase in the reservoir. When this point is reached, the oil along the gas/oil interface will have dissolved all of the injected fluid it can under the existing reservoir conditions. The buildup of a separate bank of the injected fluid in the liquid phase will, once again, tend to increase the gas/oil ratio during the subsequent recovery step so as to diminish the overall effectiveness of the operation. While the precise pressure at which the injection gas will thus convert to a separate liquid phase will depend upon the various reservoir conditions referred to above, this point can readily be observed in routine bench-scale analysis of the process. In addition, it has been found that this pressure that roughly sets the upper economic level for the injection pressure tends to be slightly higher than the critical pressure of the injected gas. Thus, in the case of ethane, this pressure at which a separate liquid phase is formed, has been found to be approximately 750 p.s.i.a. For carbon dioxide, on the other hand, this temperature has been found to be about 1,100 p.s.i.a. The use of injection pressures reaching points in excess of these values, as indicated above, do not serve to further enhance the effectiveness of the operation or the overall recovery obtainable by means of the present invention.

When the injection of the oil-soluble gas has been interrupted, the thus-saturated oil will be withdrawn from the reservoir through the well that had previously been employed for the injection of gas. In the withdrawing step, the fluids produced, i.e. the swollen oil and its dissolved gas, may be withdrawn from the reservoir through the well solely under the driving energy imparted to the oil in its swollen state or, if necessary, may be pumped to the surface by external means. In either instance, the withdrawing of fluids is continued until the instantaneous solution gas/oil ratio of the fluids thus produced from said well begins to increase at a relatively rapid rate. When this point is reached, the higher gas/oil ratio reflects the depletion of the saturated oil from the thus-contacted regions of the formation. Continued production at undesirable gas/oil ratios would only tend to diminish the overall efficiency of the recovery operation at an ever increasing rate.

At this stage of the process of the present invention, the gas injecting step is once again commenced and the cyclic operation is thereafter continued, with the injecting and withdrawing steps heretofore indicated alternately serving to swell additional quantities of high-viscosity oil at increasing distances from the well and recovering the thus-saturated, swollen oil from the formation. This cyclic operation may be continued as long as it is economically feasible to do so. Operations will generally be terminated when the cumulative solution gas/oil ratio of the fluids produced during the overall recovery operation begins to increase as the instantaneous gas/oil ratio in successive withdrawing steps rapidly reaches an uneconomic limit. When this point is reached, the decreased efficiency of gas-oil contact at increasing distances from the well, together with the decreased ability of the thus-contacted oil to drain through the reservoir, tends to preclude further economic justification for continuing the cyclic process of the present invention.

It will be noted that the gas injected into the formation, in accordance with the embodiments described above, is inherently utilized on a cyclic basis, being injected during the injection steps and recovered, together with the saturated oil, during the withdrawing steps. In another embodiment of this invention, a more complete utilization of the solution gas is achieved by alternately injecting the gas into the original well and into an offset well also positioned in the oil-bearing formation. This is accomplished by separating the solution gas from the oil recovered from the original well during the fluid withdrawal steps and injecting this solution gas into the reservoir through an offset well positioned therein. As the fluid withdrawing step continues at the original well, therefore, the recovered solution gas is being injected back into the reservoir so as to saturate and thereby swell oil in the vicinity of the offset well. This operation is continued as long as it is economically feasible to do so, in light of the factors indicated above. The steps are then reversed, with the thus-saturated oil then being withdrawn from the reservoir through the offset well. At the same time, the solution gas recovered from said offset well is injected back into the formation through the original well to saturate additional quantities of oil at increasing distances from the original well. Simultaneous cyclic operations are thereby carried out at two wells utilizing essentially one quantity of solution gas. When separate operations are carried out at each well, on the other hand, separate quantities of solution gas would be required for use in conjection with each well. The combined operation, therefore, provides a more efficient utilization of the available solution gas, while also minimizing the requirements for gas storage capacity at the surface. As in operations conducted at a single well, the combined operation may conveniently be continued until the cumulative solution gas/oil ratio from such combined operation begins to increase rapidly so that the economic justification for continuing the operation is continually diminished.

The cyclic process of the present invention, as heretofore set forth in detail, imparts the necessary driving energy to the heavy oil in the formation, while also reducing its viscosity, so as to permit the economic recovery of heavy oil from the subterranean reservoirs. This process also avoids the difficulties heretofore encountered due to variations in the permeability of the formation between injection wells and offset production wells. While the present invention thereby represents a significant improvement in the art, there are nevertheless inherent features of the invention that tend to limit the extent of the economic advantages of the present invention over prior techniques. The cyclic operation, for example, inherently necessitates the absence of oil production from a well during the time required for gas injection at that well. This disadvantage is, of course, overcome to a considerable extent by the use of the combined operation referred to above, in which the solution gas is alternately injected into an original well and into an offset well. In this embodiment, continuous production occurs through the utilization of one quantity of solution gas at two wells in accordance with the teachings of the present invention. Another limitation on the full economic utilization of the present invention concerns the available surface area of fresh solution gas-oil interface during the gas injection steps. The rate of gas solubility is dependent primarily on the available surface area of the fresh gas-oil interface. When the solution gas is initially injected into the formation, this area is roughly equivalent to the area of the wellbore. This area then increases as the gas solubility front moves outward from the well into the formation. When the solubility front has moved a few feet away from the wellbore, however, the dissolving of additional solution gas in the oil tends to become increasingly difficult because the high-viscosity oil becomes separated from the fresh solution gas being injected into the formation by a band of previously saturated oil. The dissolving of additional gas only occurs, in this instance, to the extent that the fresh solution gas can travel through the saturated oil bank and contact unsaturated heavy oil further removed from the well. As indicated above, when this point is reached, the injection step will ordinarily be interrupted, and the withdrawing of the saturated oil will be commenced. During the withdrawing step, the saturated oil will move through the formation and into the wellbore until its pressure is essentially expended. The pressure drop that exists through the formation as the saturated and swollen oil approaches the wellbore tends to cause the dissolved gas to come out of solution, thereby causing an increase in the instantaneous gas/oil ratio and ultimately reducing the total oil production achieved by the cyclic recovery operation.

These undesirable circumstances may be overcome in a further embodiment of the present invention that, as a result, achieve a further overall advantage in the practice of the present invention. In this embodiment, a fracture, or a series of fractures, is created within the producing horizon prior to commencing the injection of solution gas into the formation. Whereas in recovery operations employing an injection well and an offset production well such a fracture would be undesirable because of the resulting increase in the prospects for channeling of solution gas from one well to the other, the cyclic operation of the present invention in which injection and production occur at each well is enhanced by the fracture. In this cyclic operation at each well, little chance has been found to exist for the establishment of a continuous flow between offset wells in a manner detrimental to the purposes of the present invention. Rather, in the present invention, the fracture serves principally as a gas transportation medium to the outlining regions of the formation, thereby enhancing the heavy oil recovery technique herein described.

The initial fracturing of the formation serves a twofold purpose. In the first instance, the fracture tends to provide a convenient channel for the movement of the solution gas into regions of the formation away from the immediate vicinity of the well. This results in a great increase in the available area of the solution gas-oil interface. In each cycle, since the injection of solution gas is not impaired by the building up of a bank of saturated oil around the well. Since the solution gas is in contact with a greater amount of the high-viscosity oil in the formation during each cycle, the rate at which the solution gas dissolves in this crude oil is increased several-fold, the gas dissolving rate being proportional to the contacted area of the oil-bearing reservoir. In addition to this more effective contacting of the solution gas with the heavy oil during each cycle, the overall operation will be characterized by the solution gas having an accessibility to a far greater volume of the formation, so that the volume of oil in the reservoir that is contacted by the solution gas will be increased not only in each cycle but in the cumulative effect of the overall operation.

A further advantage of this embodiment of the present invention is noted during the saturated oil withdrawing steps. During each such step, the saturated and swollen oil in the gas-contacted regions of the formation away from the well can flow to the well as readily as the swollen oil bank of saturated oil in the more immediate vicinity of the well. This flow results from the relatively short distance that the thus-contacted oil in the distant regions of the formation must travel to reach the fracture through which the gas was originally transported to reach those regions of the formation. Upon reaching the fracture, the swollen oil can readily flow through the fracture to the well. The pressure drop resulting from this flow of swollen oil through the fracture will be less than the pressure drop that occurs when the swollen oil must flow through the unfractured formation to the well. Due to this lesser pressure drop, the gas can remain in solution for a longer period of time, thus improving both the gas/oil ratio performance during each recovery cycle and the ultimate recovery of oil in the total operation.

The fracturing of the oil-bearing formation in accordance with this embodiment of the present invention may be carried out by any of the well-known and commonly employed means for fracturing earth formations. These means include hydraulic fracturing techniques in which hydraulic pressure is applied to a body of fluid in a well positioned in the formation to be fractured. The pressure applied to the fluid, such as a gelled hydrocarbon, by surface pumps will be sufficient to separate or lift the formation, thereby producing a fracture or channel extending laterally from the wellbore. If desired, conventional solid propping agents can be included in the hydraulic fluid for deposition within the produced channel. Another well-known fracturing technique involves the positioning of explosives within the oil-bearing formation so that, upon detonation, the explosive force will create a fracture or series of fractures in the surrounding formation. The detailed procedures followed in such fracturing operations are not described herein, since such procedures are well known in the art and do not constitute an essential feature of the present invention. It should be further pointed out, however, that the fracture system need not be of any particular shape or inclination and is not necessarily limited to any single fracture plane. Thus, the fractures can be generally horizontal or vertical, or a combination thereof. For most effective utilization in the present invention, the fracture created should be as large in aerial extent as possible, while staying within the producing horizon. If the fracture were not so confined, the injected gas could quite obviously escape to other horizons.

The heavy, viscous crude oils to which the present invention is particularly directed are those commonly having a viscosity generally of at least about 25 cp. In some instances, however, heavy crudes having a viscosity many times this amount will be found. It is within the scope of this invention to treat all such heavy, viscous oils that are not susceptible to recovery by primary means. While the degree of viscosity reduction achieved in any particular instance is not an essential feature of the invention, it is deemed desirable to achieve a viscosity reduction to less than about 10 cp., preferably to about 5—10 cp., or less, if possible. In the case of crudes having extremely high viscosities, however, the desired increase in mobility may be achieved even though the viscosity of the swollen oil is still relatively high, as if, for example, a viscosity reduction on the order of 30/1 were achieved.

In experimental runs performed in accordance with this invention, a 25 inch long by 2.275 inch diameter consolidated Torpedo sandstone core was saturated with 28.0 cp. mineral oil. Ethane gas was injected into one end of the core at an injection pressure of about 550 p.s.i.g. The bank of saturated and swollen oil thus produced in the core was thereafter withdrawn from the same end of the core to a depletion pressure of about 500 p.s.i.g. The cyclic process was then repeated, with a total of 46 cycles being ultimately employed. The total oil recovery for the operation was 85 percent pore volume at a cumulative gas oil ratio of 5,500 cubic feet of ethane per barrel of oil.

In another series of runs, a 25.75 inch long by 2 inch diameter consolidated Blue jacket sandstone core was first split in two lengthwise. The two sections were then put together and encased in plastic so as to simulate a formation fracture. The original permeability of the core was 0.5 darcy, while the permeability after fracturing in this fashion was 14.0 darcy. The core was then saturated with 28 cp. mineral oil. Ethane was then injected through the core to sweep out the crack or fracture therein. With the valve at the end of the core opposite to the point of injection closed, ethane gas was injected into the core, which was at a temperature of about 82° F., to a pressure of about 575 p.s.i.g. Gas injection was then interrupted, and core fluids, i.e. oil and solution gas, were withdrawn from the core at the same end thereof as was used for gas injection. The withdrawing step was continued until a rapid increase was noticed in the instantaneous gas/oil ratio of the produced fluids. At this point, the withdrawing step was terminated, and the cycle was then repeated, with alternate gas injection and fluid recovery steps being employed. At the point at which the cumulative gas/oil ratio reached 1,480 cubic feet of ethane per barrel of oil, the oil recovery was 22.5 percent pore volume at an instantaneous gas/oil ratio of 3,930 cubic feet of ethane per barrel of oil. At an oil recovery of 50 percent pore volume, the cumulative gas/oil ratio was about 2,625 cubic feet of ethane per barrel of oil. Continuation of this cyclic operation in the split core ultimately results in an oil recovery somewhat in excess of that obtainable when utilizing an unsplit core of the same material, with the gas dissolving rate and subsequent swollen oil recovery rates being in excess of those obtainable in the absence of a simulated fracture in the core.

The recovery of high-viscosity oils from subterranean reservoirs is made difficult by the various factors referred to herein, such as lack of driving energy, the viscous nature of the crude oil, and the nonuniform permeability characteristics of some formations. The present invention provides a convenient method for supplying the necessary driving energy, for simultaneously reducing the viscosity of the heavy oil, and for overcoming the difficulties experienced in prior art techniques due to the permeability characteristics of such oil-bearing formations. The present invention, therefore, presents a highly significant development that really enhances the technical and economic feasibility of recovering such oils from their subterranean deposits.

I claim:

1. In a method for increasing the recovery of high-viscosity oil from subterranean reservoirs in which:
   a. injecting a gas highly soluble in said oil into the reservoir through a well positioned therein at an injection pressure of from at least the vapor pressure of the gas at the reservoir temperature to the pressure at which the injected gas converts to a separate liquid phase in the reservoir;
   b. continuing said injection until oil in the vicinity of the well and in the regions of the formation in communication with said well through said hereinafter recited fracture becomes saturated with said gas at the injection pressure so as to cause an appreciable swelling of the thus-contacted oil, thereby imparting driving energy to the thus-contacted oil and reducing the viscosity thereof;
   c. interrupting said injection and withdrawing the thus-saturated oil from the reservoir through said well;
   d. continuing said withdrawal until the instantaneous solution gas/oil ratio of the fluids thus produced from said well increases rapidly due to the depletion of the saturated oil from the thus-contacted regions of the formation; and
   e. thereafter continuing the cyclic operation of said injecting and withdrawing steps so as to alternately swell additional quantities of viscous oil at increasing distances from said well throughout the formation, the improvement comprising fracturing the oil-bearing formation within the production horizon of said reservoir in the vicinity of said well prior to injecting the gas highly soluble in said oil into the reservoir.

2. The method of claim 1 in which the fracturing is accomplished by hydraulic fracturing of the formation.

3. The method of claim 1 in which the fracturing is accomplished by explosive fracturing of the formation.

4. The method of claim 1 in which the highly soluble gas is selected from the group consisting of ethane and carbon dioxide and mixtures thereof.

5. The method of claim 1 in which the viscosity of the oil is at least about 25 centipoises.

6. The method of claim 1 in which the injected gas comprises ethane.

7. The method of claim 6 in which the reservoir temperature is from about 75° F. to about 100° F.

8. The method of claim 7 in which the injection pressure is in the range of from at least the vapor pressure of ethane at the reservoir temperature to about 750 p.s.i.a.

9. The method of claim 1 in which the injected gas comprises carbon dioxide.

10. The method of claim 9 in which the reservoir temperature is from about 75° F. to about 100° F.

11. The method of claim 10 in which the injection pressure is in the range of from at least the vapor pressure of carbon dioxide at the reservoir temperature to about 1,100 p.s.i.a.

12. The method of claim 1 in which said cyclic operation is continued until the cumulative solution gas/oil ratio of the fluids produced increases rapidly due to the decreased efficiency of gas-oil contact as depletion of the thus-contacted oil continues and the decreased ability of the thus-contacted oil to drain through the reservoir, including the fracture therein, to the immediate vicinity of the well.

13. The method of claim 1 and including the injection of the solution gas recovered from the original well during said withdrawing steps into the reservoir through an offset well so as to saturate oil in the vicinity of said offset well at the injection pressure and thereafter withdrawing the thus-saturated oil from the reservoir through the offset well, and injecting the solution gas recovered from said offset well back into the formation through said original well to saturate additional quantities of oil, whereby the solution gas may be continuously utilized for the swelling of additional quantities of heavy oil as opposed to its inherently cyclic use with respect to a single well.

14. The method of claim 13 in which said cyclic combined operation between said original well and said offset well is continued until the cumulative solution gas/oil ratio from said combined operation increases rapidly.